Feb. 21, 1928.
J. W. FAY
1,659,911
APPARATUS FOR PERFORMING SOLDERING OPERATIONS
Filed June 13, 1924    2 Sheets-Sheet 2
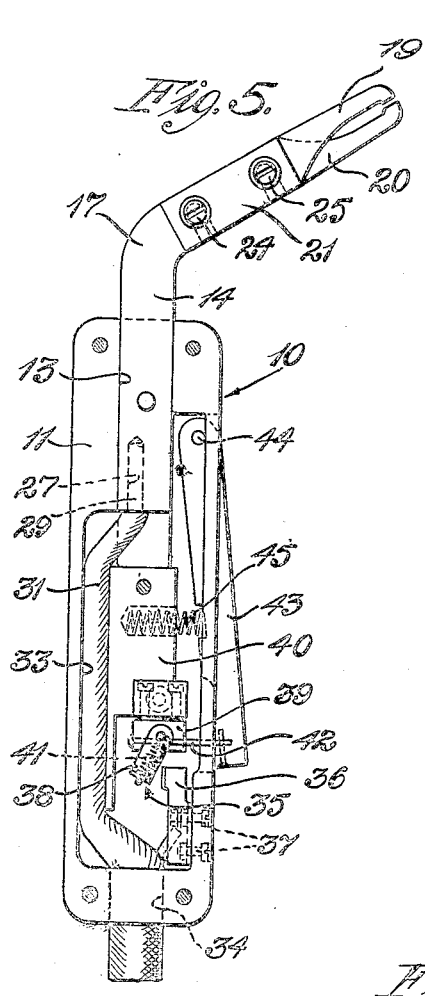
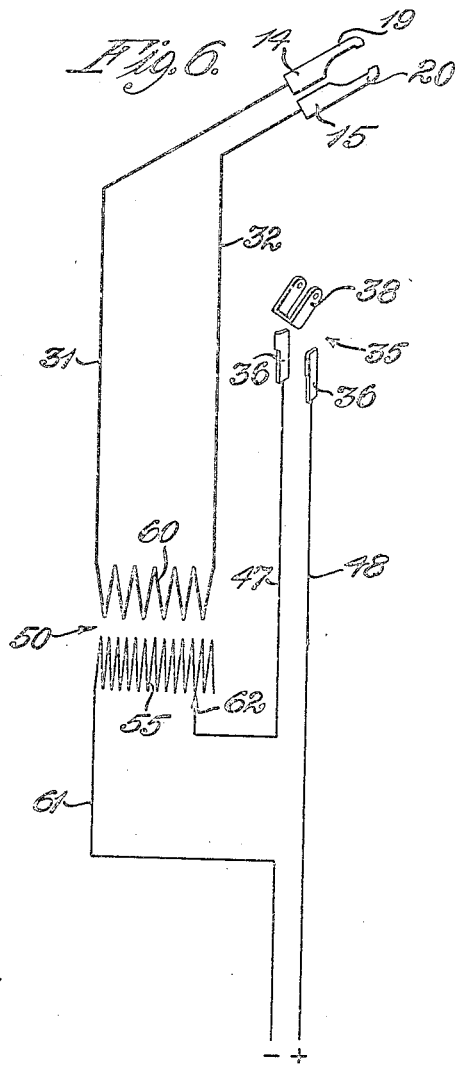
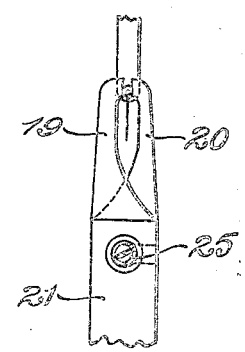
Inventor
Joseph W. Fay
by Habermann
Atty.

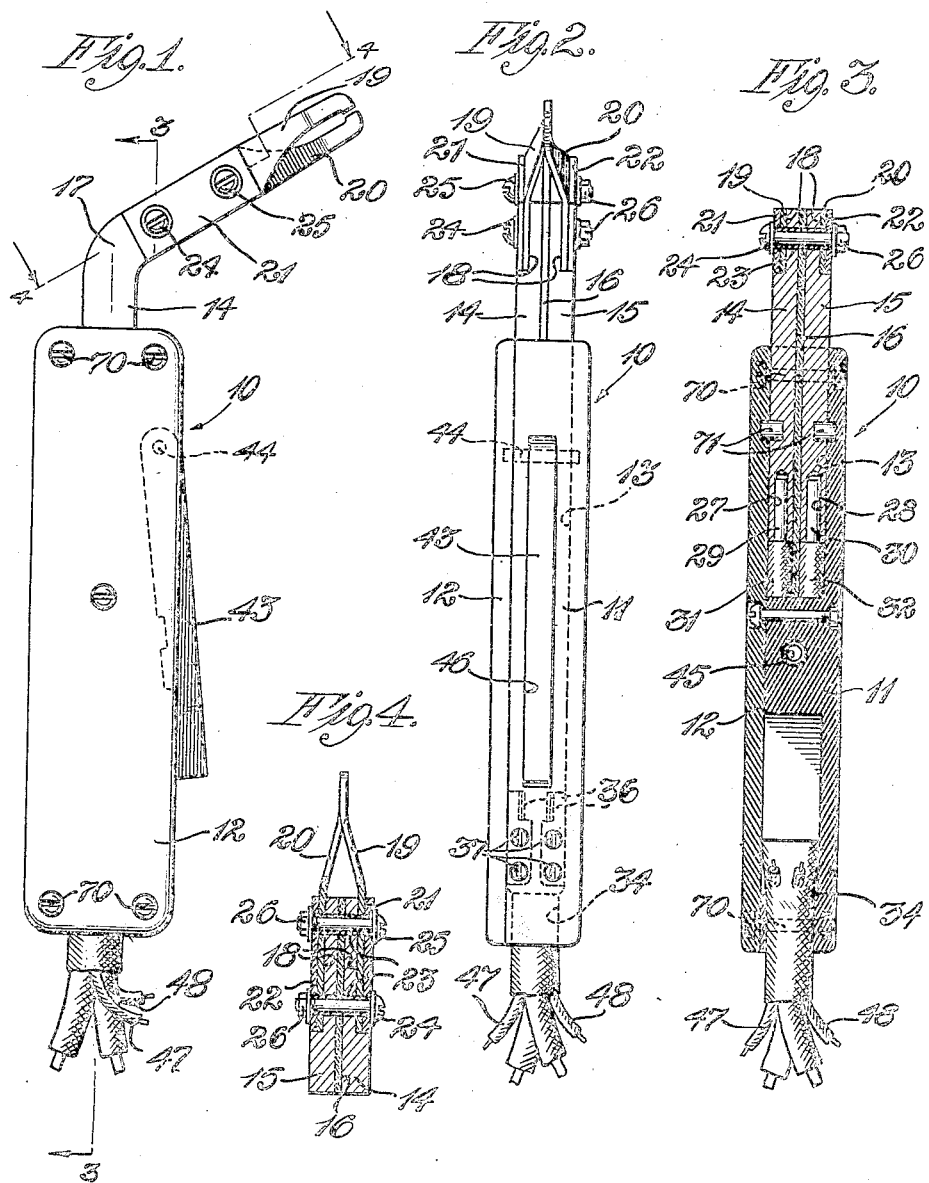

Patented Feb. 21, 1928.

1,659,911

UNITED STATES PATENT OFFICE.

JOSEPH WILLIAM FAY, OF VILLA PARK, ILLINOIS, ASSIGNOR TO WESTERN ELECTRIC COMPANY, INCORPORATED, OF NEW YORK, N. Y., A CORPORATION OF NEW YORK.

APPARATUS FOR PERFORMING SOLDERING OPERATIONS.

Application filed June 13, 1924. Serial No. 719,783.

This invention relates to improvements in apparatus for performing soldering operations.

The primary object of the invention is to provide apparatus of this type wherein the heat for the soldering operation is generated electrically in the object to be soldered.

Another object of the invention is to provide a soldering iron so designed that heat is generated in the object to be soldered rather than conducted from the iron to the object as has been the usual practice.

Another object of the invention is to provide a soldering iron of the above type in which heat is generated in the object to be soldered by electricity delivered to it by the soldering iron.

Still another object of the invention is to provide a soldering iron, wherein the heat for the soldering operation is generated electrically, so designed that the electrical energy is only consumed during the actual soldering operation and when the iron is not in use the current is cut off.

The method embodying the invention consists in generating directly, by means of electricity, heat in the object to be soldered, this heat being of a degree high enough to melt the solder, which is applied to the heated object or heated portion thereof where the soldering operation is to be performed. An apparatus for performing this method may comprise briefly, two spaced elements connected with opposite sides of an electrical circuit, the elements being adapted to engage the object to be soldered, the said object closing a circuit between the elements whereby the passage of the current through the object heats it sufficiently to permit soldering thereto. A suitable switch device for the electrical current is provided, which is preferably located in the handle of the soldering iron, so that this switch may be readily closed by the operator at the time the soldering operation takes place, the switch being normally open thereby resulting in a conservation of electrical energy which is only utilized at the time the soldering operation is performed. An iron of this type equipped with a switch also reduces the fire hazard which is generally incident to soldering irons of the type that are constantly heated even though used intermittently.

Another feature of the invention consists in the use of a metal for the spaced elements which has such characteristics that the elements will hold the solder stable during the soldering operation and will neither repel it nor cause the solder to become unduly fused thereon.

Other objects and advantages of the present invention will be more fully set forth in the following description and will be particularly pointed out in the claims.

The drawings illustrate an apparatus by which the method may be performed and in which:

Fig. 1 is a side elevation of the improved soldering iron;

Fig. 2 is an end elevation thereof;

Fig. 3 is a vertical sectional view taken on the line 3—3 of Fig. 1 and looking in the direction indicated by the arrows;

Fig. 4 is a sectional view taken on the line 4—4 of Fig. 1 and looking in the direction of the arrows;

Fig. 5 is a side elevation of the mechanism shown in Fig. 1 with the cover portion of the soldering iron handle removed to show the construction and arrangement of the mechanism mounted within the handle;

Fig. 6 is a diagrammatical illustration of the circuit connections of the soldering iron; and Fig. 7 is a fragmentary detail view showing the manner in which the soldering iron is contacted with an object during soldering operation.

It is believed that the improved method will be readily understood by a detailed description of the apparatus by which it may be performed.

Referring now to the drawings in detail in which like reference numerals designate similar parts throughout the several views, 10 indicates generally the body portion of the soldering iron which portion also serves as a handle. The body portion comprises a base member 11 and a cover member 12 formed of bakelite, redmanol or other suitable electrical insulating material which is not adversely affected by high temperature. Mounted within a groove 13 formed in the base member 11 (Figs. 3 and 5), are a pair of flat bars 14 and 15 preferably made of copper or other material of low electrical resistance. The bars 14 and 15 are spaced apart by a strip of insulating material 16 of any suitable character preferably laminated mica. The bars 14 and 15 and the mounting strip 16 project beyond the base member 11 and the projecting portions thereof may be given any desirable shape dependent upon the use to which the soldering iron is to be put, these portions in the soldering iron illustrated in the drawing being bent at an obtuse angle at the point 17. Each of the members 14 and 15 is cut away at 18 (Fig. 3) a distance sufficient to receive soldering tips 19 and 20 respectively and clamping plates 21 and 22 respectively. The bars 14 and 15, soldering tips 19 and 20 and the locking plates 21 and 22 are provided with aligned openings which are adapted to receive sleeves 23 of fibre or other suitable insulating material. Mounted within each of the sleeves are bolts 24 and 25 which receive on their ends nuts 26, these bolts and nuts serving to firmly clamp together the bars, soldering tips and locking plates so that they constitute a single unit.

The soldering tips 19 and 20 may be of any suitable design dependent upon the work for which the soldering iron is to be employed. In the iron illustrated in the drawings the portions of the tips which project beyond the locking plates are tapered and bent toward each other in such manner that the ends of the tips are disposed in substantially the same plane and are spaced apart from each other about 1/8".

The ends of the bars 14 and 15 mounted within the base member 11 are provided with bores 27 and 28 to receive terminal tips 29 and 30, respectively, suitably attached to the ends of electrical conductors 31 and 32 respectively. Portions of these conductors lie within the slot 13 and also within a slot 33 (Fig. 5) formed in the base member 11, the said conductors passing out of the base member 11 through an opening 34 made in the end wall thereof.

Mounted within the base member 11 is any suitable type of switch indicated generally by the reference letter 35, this switch preferably being of a type which is normally held open by a spring but which may be closed manually. The switch illustrated in the drawings comprises two stationary contacts 36 mounted on a suitable plate which is attached to the inside of the side wall of the base member 11 by means of screws 37. Cooperating with the stationary contacts 36 are a pair of movable contacts 38 which are pivoted upon a suitable support 39 secured to an abutment 40 integral with base 11. The movable contacts 38 are normally held in the position illustrated, in which they are out of engagement with the stationary contacts 36, by means of a spring 41. The movable contacts 38 may be moved into engagement with the stationary contacts 36 by means of a plunger 42 which is suitably connected with an operating handle or trigger 43 pivoted at 44, this trigger being held by a compression spring 45 in the position illustrated in which the trigger projects through a slot 46 made in the side wall of the base member 11. Since the switch 35 is of the usual snap switch type it is not believed that any further detailed description of it will be necessary. It is readily understood that upon depressing the trigger 43 the movable contacts 38 will be brought into engagement with the stationary contacts 36 and when pressure is relieved from the trigger 43 it will be returned to the normal position illustrated in which the movable contacts 38 are out of engagement with the stationary contacts 36. Connected with the stationary contacts 36 are conductors 47 and 48 which pass outside of the base member 11 through the opening 34 in the end wall thereof.

The cover 13 serves to enclose the mechanism within the base member 12 and is held in place by suitable bolts 70 passing through the base and cover. To hold the bars 14 and 15 and their associated elements in proper position within the handle they are provided with lugs 71 which enter proper aligned depressions in the base 12 and cover 13 (Fig. 3).

The electrical circuit for the soldering iron is illustrated diagrammatically in Fig. 6 wherein 50 indicates generally a transformer having a primary winding 55 and a secondary winding 60, one side of the primary winding 55 being connected by a conductor 61 with one side of a suitable source of current (not shown). Adjustably cooperating with the primary winding 55 of the transformer 50 is a contact point 62 which is connected by a conductor 47 with one of the stationary contacts 36 of the switch 35, the other stationary contact 36 being connected by the conductor 48 to the opposite side of the source of current (not shown). The conductor 31 connected to the bar 14 is connected with one side of the secondary winding 60 of the transformer 50 and the conductor 32 connected with the bar 15 has its other end connected with the opposite side of the secondary winding 60 of the transformer 50.

The transformer 50 and the source of current should be designed and selected according to the work for which the soldering iron is to be employed. The iron illustrated in the drawing is particularly designed for soldering contact to contact springs constituting a part of central office equipment for telephone systems. In the circuit employed for this work the current source has a potential of 55 volts, and the transformer 50 is so adjusted that the potential of the soldering tips 19 and 20 is from 1.4 to 1.82 volts.

In the operation of the soldering iron shown in the drawing the soldering tips 19 and 20 are disposed upon the contact spring to be soldered in the position illustrated in Fig. 7 and the trigger 43 operated to close the circuit of the primary winding of the transformer through the switch 35. The current induced in the secondary winding of the transformer then flows between the soldering tips 19 and 20 through the contact spring heating said spring to a temperature high enough to melt solder and as soon as the spring has reached this temperature, which in usual instances occurs within two seconds, the solder may be applied. Upon the completion of the soldering operation the soldering tips are removed from the spring, and pressure upon the trigger 43 relieved to permit the switch 35 to open and break the circuit of the primary winding 55 of the transformer 50. From this it will be apparent that electrical energy is only consumed at the time the soldering operation is in progress and when the iron is not in use no current is consumed and no heat is generated in the iron which might occasion considerable fire hazard. Since the circuit through the soldering tips 19 and 20 is only closed when in use the switch 35 is not essential to the operation of the iron but is employed as a safe-guard against accidental short circuiting of the primary winding of the transformer through the soldering tips 19 and 20.

The soldering tips may be made of any suitable high resistance material but considerable experimental work has disclosed that the best material suitable is an alloy of approximately 37½% nickel and the balance iron. In use it is found that this alloy does not repel the solder or fuse the solder unduly to the soldering tips, while in addition permits rapid soldering with substantially no sputtering and very little deterioration of the tips.

What is claimed is:

1. A soldering iron comprising a body portion, two spaced soldering elements carried thereby, electrical conductors connected with said elements and mounted in said body portion to connect the spaced elements with the opposite side of an electrical circuit, and an electrical switch mounted in said body portion and conductors attached thereto for connection with said electrical circuit.

2. A soldering iron comprising a body portion, two spaced soldering elements carried thereby and electrically insulated from each other, electrical conductors mounted in said body portion adapted to connect said spaced elements with the opposite sides of an electrical circuit, a switch carried by said body portion, electrical conductors connected with said switch adapted to be connected with said electrical circuit, said switch so designed that it is normally open and a manually operable handle for closing said switch.

3. A soldering iron comprising a body portion, two metallic elements carried thereby and electrically insulated from each other, a soldering tip removably secured to each of said elements, said tip so constructed that when they are in their assembled position they are spaced apart and means for connecting said metallic elements to the opposite sides of an electrical circuit.

4. A soldering iron comprising a body portion, two metallic elements carried by said body portion and electrically insulated from each other, said elements formed of low resistance metal, a soldering tip secured to each of said elements, each soldering tip having a high resistance as compared with its associated element, said tips spaced apart, and means for connecting said elements with the opposite sides of an electrical circuit.

In witness whereof, I hereunto subscribe my name this 31 day of May, A. D. 1924.

JOSEPH WILLIAM FAY.